United States Patent
Bhaggan et al.

(10) Patent No.: US 12,245,606 B2
(45) Date of Patent: Mar. 11, 2025

(54) FAT COMPOSITION

(71) Applicant: Bunge Loders Croklaan B.V., Wormerveer (NL)

(72) Inventors: Krishnadath Bhaggan, Wormerveer (NL); Jeanine Werleman, Wormerveer (NL); Willem Dekker, Wormerveer (NL); Antina Frederine Frericks, Wormerveer (NL)

(73) Assignee: Bunge Loders Croklaan B.V., Wormerveer (NL)

( * ) Notice: Subject to any disclaimer, the term of this patent is extended or adjusted under 35 U.S.C. 154(b) by 774 days.

(21) Appl. No.: 17/264,323

(22) PCT Filed: Jul. 29, 2019

(86) PCT No.: PCT/EP2019/070389
§ 371 (c)(1),
(2) Date: Jan. 29, 2021

(87) PCT Pub. No.: WO2020/025555
PCT Pub. Date: Feb. 6, 2020

(65) Prior Publication Data
US 2021/0289807 A1    Sep. 23, 2021

(30) Foreign Application Priority Data
Jul. 31, 2018 (EP) ..................................... 18275110

(51) Int. Cl.
*A23D 9/007* (2006.01)
*A23D 9/04* (2006.01)
(Continued)

(52) U.S. Cl.
CPC ............... *A23D 9/007* (2013.01); *A23D 9/04* (2013.01); *A23G 1/38* (2013.01); *A23L 29/10* (2016.08); *C11C 3/10* (2013.01); *C11C 3/12* (2013.01)

(58) Field of Classification Search
CPC ........... A23D 9/007; A23D 9/04; A23L 29/10; A23G 1/38; C11C 3/10; C11C 3/12
See application file for complete search history.

(56) References Cited

U.S. PATENT DOCUMENTS

| | | |
|---|---|---|
| 5,439,700 A | 8/1995 | Cain et al. |
| 5,932,275 A | 8/1999 | Nalur |

(Continued)

FOREIGN PATENT DOCUMENTS

| | | |
|---|---|---|
| IN | IN/602/MUM/2014 | 2/2014 |
| JP | 2011-4604 A | 1/2011 |

(Continued)

OTHER PUBLICATIONS

Rossell, "Fractionation of Lauric Oils," Journal of the American Oil Chemists' Society, 62 (2): 385-390 (1985).

(Continued)

*Primary Examiner* — Donald R Spamer
*Assistant Examiner* — Assaf Zilbering
(74) *Attorney, Agent, or Firm* — Morgan, Lewis & Bockius LLP

(57) ABSTRACT

A fat composition comprises: from 48% to 58% by weight of lauric acid (C12:0); from 5% to 15% by weight palmitic acid (C16:0); from 5% to 20% by weight stearic acid (C18:0); and a weight ratio of stearic acid (C18:0) to palmitic acid (C16:0) of from 0.5:1 to 2.5:1; the percentages of acids referring to acids bound as acyl groups in glycerides in the fat composition and being based on the total weight of C8 to C24 fatty acids; and at least 40 solid fat content at 30°

(Continued)

C.; at most 5 solid fat content at 40° C.; solid fat content measured on unstabilized fat according to ISO 8292-1.

13 Claims, 2 Drawing Sheets

(51) Int. Cl.
*A23G 1/38* (2006.01)
*A23L 29/10* (2016.01)
*C11C 3/10* (2006.01)
*C11C 3/12* (2006.01)

(56) References Cited

U.S. PATENT DOCUMENTS

| | | |
|---|---|---|
| 6,210,739 B1 | 4/2001 | Nalur |
| 2006/0051488 A1* | 3/2006 | De Muijnck ............ A23G 3/40 426/607 |
| 2015/0056357 A1* | 2/2015 | Bhaggan ................ A21D 2/165 426/549 |
| 2015/0164102 A1 | 6/2015 | Cruz et al. |
| 2017/0119008 A1 | 5/2017 | Cruz Serna |

FOREIGN PATENT DOCUMENTS

| | | |
|---|---|---|
| WO | 2010/073899 A1 | 7/2010 |
| WO | 2014/141904 A1 | 9/2014 |

OTHER PUBLICATIONS

Matsui et al., "Material design for hard butter from vegetable fats," Crystallization and Polymorphism of Fats and Fatty Acids, 395-422 (1988).
Calliauw et al., "Production of cocoa butter substitutes via two-stage static fractionation of palm kernel oil," Journal of the American Oil Chemists' Society, 82 (11): 783-789 (2005).
Lai "Chapter 30: Palm Oil, Its Fractions and Components," Healthful, 1-14 (2005).
Timms, "Confectionery Fats Handbook, Chapter 6: Production and characteristic properties," 191-215; 282-285 (2003).
International Search Report issued in corresponding International Patent Application No. PCT/EP2019/070389 dated Oct. 10, 2019.
Written Opinion issued in corresponding International Patent Application No. PCT/EP2019/070389 dated Oct. 10, 2019.
"Calculated Iodine Value", 1997, AOCS Recommended Practice, 1 page total.
Notice for Reasons for Rejection issued Jul. 25, 2023 for Japanese Patent Application No. 2021-529518 (See Machine Translation).

\* cited by examiner

FAT COMPOSITION

This invention relates to a fat composition, uses thereof, a process to produce the fat composition and a confectionery product comprising the fat composition.

BACKGROUND

Compound chocolate is a confectionery product made from a combination of cocoa powder, vegetable fat, sweeteners and possibly other additives. The vegetable fats often used are coconut oil or palm kernel oil in place of cocoa butter. Due to the fact that no tempering is needed to produce compound chocolate, it can be simply applied for any type of application.

Palm kernel oil is an important lauric oil, which is produced from the kernels of the oil palm. Palm kernel oil can be fractionated to provide a stearin with much better melting properties, which can be used as a cocoa butter substitute. It is usually hydrogenated to further improve its melting profile.

For tropical climates, the heat resistance of compound chocolate can be improved by increasing the amount of solids in the fat phase at a relatively high temperature (e.g. 30° C.-40° C.). However, such fat modification often leads to products with unsatisfied organoleptic properties of a confectionery product, such as significant waxy mouthfeel.

US 2015/164102 relates to a trans-fat free cocoa butter substitute and its production process which has a lower quantity of saturated fatty acids than cocoa butter, common cocoa butter substitutes, and lauric fats, for coating and molding applications in chocolate products with adequate texture, gloss, and melting profile characteristics, and a good speed of crystallization during a cooling process without tempering.

U.S. Pat. No. 5,439,700 concerns blends of lauric fats, with certain specification for N30, oleic content, lauric content and elaidic content and fractions of natural fats with an S3 content of at least 50 weight percent. These blends are described as being useful fats for the preparation of coating fats for confectionery products.

U.S. Pat. No. 5,932,275 describes oil blends suitable for use as cocoa butter substitutes. These oil blends are based on palm kernel oil and its derivatives, and include palm kernel oil, hydrogenated palm kernel oil, palm kernel stearin and hydrogenated palm kernel stearin.

Also disclosed are edible food products such as confectionery products and chocolate alternative compositions made from these palm kernel oil blends.

U.S. Pat. No. 6,210,739 relates to novel oil blends including palm kernel oil, hydrogenated palm kernel oil, palm kernel stearin and hydrogenated palm kernel stearin, and at least one seeding agent, optionally with hydrogenated palm kernel oil, hydrogenated coconut oil, coconut oil, palm kernel oil, or a mixture thereof suitable for use in edible products such as confectionery products and chocolate alternative compositions.

IN00602MU2014 relates to fat compositions comprising hydrogenated stearin and hydrogenated olein wherein at least one of the hydrogenated stearin or hydrogenated olein is interesterified.

US 2017/119008 describes a trans free and low saturated fat cocoa butter alternative and the method of making thereof.

DESCRIPTION OF THE INVENTION

There remains a need for fat compositions which can be used to make a confectionery product such as compound chocolate with both improved heat resistance properties and desirable organoleptic properties, particularly being quick melting and having non-waxiness mouthfeel characteristics.

According to the present invention, there is provided a fat composition comprising from 48% to 58% by weight of lauric acid (C12:0); from 5% to 15% by weight palmitic acid (C16:0); from 5% to 20% by weight stearic acid (C18:0); and a weight ratio of stearic acid (C18:0) to palmitic acid (C16:0) of from 0.6:1 to 2.5:1; the percentages of acids and ratio referring to acids bound as acyl groups in glycerides in the fat composition and being based on the total weight of C8 to 024 fatty acids; and at least 40 solid fat content at 30° C.; at most 5 solid fat content at 40° C.; solid fat content measured on unstabilized fat according to ISO 8292-1.

The fat composition of this invention has been found to be particularly useful as an ingredient for confectionery applications in tropical climates. Fat compositions according to the invention provide not only particularly good heat resistance properties but also outstandingly favorable organoleptic properties. In particular, the fat composition according to the invention provides good and stable physical properties in compound chocolate.

The fat composition of the invention may be made from naturally occurring or synthetic fats, fractions of naturally occurring or synthetic fats, or mixtures thereof, that satisfy the requirements for fatty acids and solid fat contents defined herein. Preferably, the fat composition is derived from a blend of naturally occurring fats.

The term "fat" refers to glyceride fats and oils containing fatty acid acyl groups and does not imply any particular melting point. The term "oil" is used synonymously with "fat".

The term "fatty acid", as used herein, refers to straight chain saturated or unsaturated (including mono- and poly unsaturated) carboxylic acids having from 8 to 24 carbon atoms. A fatty acid having x carbon atoms and y double bonds may be denoted Cx:y. For example, palmitic acid may be denoted C16:0 and oleic acid may be denoted C18:1. Percentages of fatty acids in compositions referred to herein include acyl groups in tri-, di- and mono-glycerides present in the glycerides and are based on the total weight of C8 to C24 fatty acids. The fatty acid profile (i.e., composition) may be determined, for example, by fatty acid methyl ester analysis (FAME) using gas chromatography according to ISO 12966-2 and ISO 12966-4.

The fat composition of this invention contains from 48% to 58% by weight of lauric acid (C12:0) based on the total weight of C8 to C24 fatty acids. The fat composition preferably contains from 50% to 56% by weight of total lauric acid (C12:0), more preferably from 51% to 55%, such as 52% to 55%, by weight of total lauric acid (C12:0).

The palmitic acid (C16:0) content of the fat composition of the invention is from 5% to 15% by weight based on the total weight of C8 to C24 fatty acids, preferably from 8% to 13% by weight, more preferably from 9% to 12% by weight.

The stearic acid (C18:0) content of the fat composition of the invention is from 5% to 20% by weight based on the total weight of C8 to C24 fatty acids, preferably from 8% to 13% by weight, more preferably from 9% to 12% by weight.

The weight ratio of stearic acid (C18:0) to palmitic acid (C16:0) in the fat composition is in the range of from 0.6:1 to 2.5:1; preferably from 0.1 to 2:1 and more preferably from 0.92:1 to 1.5:1.

A preferred fat composition of the invention therefore comprises, based on the total weight of C8 to 024 fatty acids: from 50% to 56% by weight of lauric acid (012:0); from 8% to 13% by weight of palmitic acid (C16:0); and from 8% to 13% by weight of stearic acid (C18:0); wherein the weight ratio of stearic acid (C18:0) to palmitic acid (C16:0) is from 0.7:1 to 2:1, said percentages and ratios of acids referring to acids bound as acyl groups in glycerides in the fat composition and said percentages being based on the total weight of C8 to 024 fatty acids.

The fat composition of the invention has at least 40 solid fat content at 30° C. and at most 5 solid fat content at 40° C., measured on unstabilized fat according to ISO 8292-1. The solid fat content is a percentage, so a solid fat content of x at y ° C. means that x % of the fat is solid at y ° C. according to ISO 8292-1.

Preferably the fat composition has from 40 to 55 solid fat content at 30° C., more preferably from 43 to 53 solid fat content at 30° C., measured on unstabilized fat according to ISO 8292-1.

Preferably the fat composition has at most 4 solid fat content at 40° C., more preferably at most 3 solid fat content at 40° C., measured on unstabilized fat according to ISO 8292-1.

Preferably the fat composition has at least 90 solid fat content at 20° C., more preferably at least 92 solid fat content at 20° C., measured on unstabilized fat according to ISO 8292-1.

Preferably the fat composition has from 5 to 12 solid fat content at 35° C., more preferably from 5 to 10 solid fat content at 35°, measured on unstabilized fat according to ISO 8292-1.

Accordingly, a preferred fat composition of the invention has: from 40 to 55 solid fat content at 30° C.; at most 4 solid fat content at 40° C.; at least 90 solid fat content at 20° C.; and from 5 to 12 solid fat content at 35° C.; solid fat content measured on unstabilized fat according to ISO 8292-1.

A most preferred embodiment of the invention comprises: from 52% to 55% by weight of total lauric acid (C12:0); from 9% to 12% by weight of palmitic acid; and from 9% to 12% by weight of stearic acid; wherein the weight ratio of stearic acid (C18:0) to palmitic acid (C16:0) is from 0.92:1 to 1.5:1, said percentages and ratios of acids referring to acids bound as acyl groups in glycerides in the fat composition and said percentages being based on the total weight of C8 to C24 fatty acids; and wherein the fat composition has from 43 to 53 solid fat content at 30° C.; at most 3 solid fat content at 40° C.; at least 92 solid fat content at 20° C.; and from 5 to 10 solid fat content at 35° C.; solid fat content measured on unstabilized fat according to ISO 8292-1.

It is believed that the confectionery products such as compound chocolate have not only a stable structure in tropical climates but also desirable melting behavior when they comprise a fat composition at N30 and/or N40 within the preferred ranges.

The term "lauric oil" refers to glyceride fats and oils comprising predominantly short- and medium chain fatty acid (caprylic acid (C8:0), capric acid (C10:0), lauric acid (C12:0) and myristic acid (C14:0)), for example, coconut oil, palm kernel oil, babassu oil, cohune oil and cuphea oil.

The term "iodine value" refers to the number of grams of iodine that could be added to 100 g of oil, which is measured with the AOCS Method cd 1-25.

The term "emulsifier" refers to a substance kinetically increasing the stability of an emulsion, for example, lecithin, polyglycerol polyricinoleate (PGPR), sorbitan tristearate, sorbitan monostearate, mono- and diglycerides, distilled monoglycerides and propylene glycol esters of fatty acids In a preferred embodiment, the fat composition comprises at least one hydrogenated lauric oil selected from palm kernel oil, palm kernel oil fractions, coconut oil, coconut oil fractions and mixtures thereof; at least one interesterified hydrogenated lauric oil selected from palm kernel oil, palm kernel oil fractions, coconut oil, coconut oil fractions and mixtures thereof; at least one non-lauric oil with iodine value lower than 15; and optionally one or more emulsifiers.

In a more preferred embodiment, the fat composition comprises hydrogenated palm kernel oil stearin, interesterified hydrogenated palm kernel oil stearin, hydrogenated palm oil and optionally sorbitan tristearate.

Preferably, the fat composition comprises from 70% to 95% by weight hydrogenated palm kernel oil stearin; from 5% to 25% by weight interesterified hydrogenated palm kernel oil stearin; from 1% to 4% by weight hydrogenated palm oil; and optionally from 1% to 3% by weight sorbitan tristearate.

More preferably, the fat composition comprises from 75% to 90% by weight hydrogenated palm kernel oil stearin; from 8% to 18% by weight interesterified hydrogenated palm kernel oil stearin; from 2% to 3% by weight hydrogenated palm oil; and optionally from 1% to 3% by weight sorbitan tristearate.

The invention also relates to the use of a fat composition according to the invention for a confectionery application, such as in compound chocolate.

Confectionery products preferably comprise the fat composition of the invention, sugar or other sweeteners, one or more ingredients selected from milk powder, milk fat, cocoa powder, cocoa massa, vanilla, and lecithin and optionally other ingredients.

In a preferred embodiment, the fat composition of the invention is used for (or may be suitable for use in) compound chocolate. The compound chocolate produced using the fat composition of the invention has been found to have not only heat stability properties but also favorable organoleptic properties. Compound chocolate may comprise the fat composition of the invention, sugar, cocoa powder, one or more of skimmed milk powder, vanilla and emulsifiers such as sorbitan tristearate, lecithin or polyglycerol polyricinoleate (PGPR). Typically, a compound chocolate comprises 30% to 60% by weight sugar, 20% to 50% by weight fat; 5% to 20% by weight skimmed milk powder, 5% to 20% by weight cocoa powder, up to 0.3% by weight vanilla and up to 5% by weight emulsifier.

The invention also relates to a process for making the fat composition comprising blending at least one hydrogenated lauric oil selected from palm kernel oil, palm kernel oil fractions, coconut oil, coconut oil fractions and mixtures thereof; at least one interesterified hydrogenated lauric oil selected from palm kernel oil, palm kernel oil fractions, coconut oil, coconut oil fractions and mixtures thereof; at least one non-lauric oil with iodine value lower than 15; and optionally one or more emulsifiers.

In a preferred embodiment, the process for making the fat composition comprises blending from 70% to 95% by weight hydrogenated palm kernel oil stearin; from 5% to 25% by weight interesterified hydrogenated palm kernel oil stearin; from 1% to 4% by weight hydrogenated palm oil; and optionally from 1% to 3% by weight sorbitan tristearate.

In a more preferred embodiment, the process for making the fat composition comprises blending from 75% to 90% by weight hydrogenated palm kernel oil stearin; from 8% to 18% by weight interesterified hydrogenated palm kernel oil stearin; from 2% to 3% by weight hydrogenated palm oil; and optionally from 1% to 3% by weight sorbitan tristearate.

The process of the invention preferably comprises one or more steps of bleaching and/or deodorization of the components of the blend or the product after blending, typically after hydrogenation or interesterification and/or after any blending.

The invention also relates to a confectionery product comprising at least 20% by weight the fat composition of the invention and at least 30% by weight sugar or other sweeteners. The confectionery product comprising the fat composition of the invention comprises also preferably at least 5% by weight of one or more of milk powder, vegetable milk powder, dairy powder or mixtures thereof.

Further provided by the invention is a method of making the confectionery product of the invention comprising combining: at least 20% by weight of the fat composition of the invention with at least 30% by weight sugar or other sweeteners.

Also provided by the invention is the use of the fat composition of the invention for improving heat resistance in a confectionery product, wherein the confectionery product is preferably compound chocolate. Preferably, the use comprises providing a product that is quick melting with non-waxy mouthfeel characteristics The listing or discussion of an apparently prior-published document in this specification should not necessarily be taken as an acknowledgement that the document is part of the state of the art or is common general knowledge.

Preferences and options for a given aspect, embodiment, feature or parameter of the invention should, unless the context indicates otherwise, be regarded as having been disclosed in combination with any and all preferences and options for all other aspects, embodiments, features and parameters of the invention.

The following non-limiting examples illustrate the invention and do not limit its scope in any way. In the examples and throughout this specification, all percentages, parts and ratios are by weight unless indicated otherwise.

EXAMPLES

Example 1

Two fat blends according to the invention were prepared.

Fat A is a blend of 87% by weight fully hydrogenated palm kernel stearin, 9% by weight of chemically interesterified fully hydrogenated palm kernel stearin, 2% fully hydrogenated palm oil (iodine value lower than 3) and 2% sorbitan tristearate.

Fat B is a blend of 78.4% by weight fully hydrogenated palm kernel stearin, 16.7% by weight of chemically interesterified fully hydrogenated palm kernel stearin, 2.9% fully hydrogenated palm oil (iodine value lower than 3) and 2% sorbitan tristearate.

The analytical results of Fat A and Fat B are shown in Table 1.

TABLE 1

Fat composition of Fat A and Fat B

| | Fat A | Fat B |
|---|---|---|
| US-N20 | 95.6 | 95.6 |
| US-N25 | 90.4 | 89.6 |
| US-N30 | 50.3 | 47.9 |
| US-N35 | 5.1 | 5.8 |
| US-N40 | 0.2 | 0.3 |
| C8:0 | 1.6 | 1.8 |
| C10:0 | 2.6 | 2.8 |
| C12:0 | 52.6 | 54.1 |
| C14:0 | 21.2 | 20.1 |
| C15:0 | 0.0 | 0.0 |
| C16:0 | 10.7 | 10.4 |
| C16:1T | 0.0 | 0.0 |
| C16:1C | 0.0 | 0.0 |
| C17:0 | 0.0 | 0.0 |
| C18:0 | 10.8 | 10.3 |
| C18:1 | 0.2 | 0.2 |
| C18:1T | 0.1 | 0.1 |
| C18:1C | 0.1 | 0.1 |
| C18:2 | 0.0 | 0.0 |
| C18:2T | 0.0 | 0.0 |
| C18:2C | 0.0 | 0.0 |
| C18:3 | 0.0 | 0.0 |
| C18:3T | 0.0 | 0.0 |
| C18:3C | 0.0 | 0.0 |
| C20:0 | 0.2 | 0.2 |
| C20:1C | 0.0 | 0.0 |
| C20:2C | 0.0 | 0.0 |
| C22:0 | 0.0 | 0.0 |
| C22:1 | 0.0 | 0.0 |
| C22:1T | 0.0 | 0.0 |
| C22:1C | 0.0 | 0.0 |
| C24:0 | 0.0 | 0.0 |
| C24:1C | 0.0 | 0.0 |
| SAFA | 99.7 | 99.7 |
| MUFA | 0.2 | 0.2 |
| PUFA | 0.0 | 0.0 |
| IVFAME | 0.2 | 0.2 |
| Total Trans | 0.1 | 0.1 |
| Others | 0.1 | 0.1 |
| C18:0/C16:0 | 1.01 | 0.99 |

In the above table:
Cx:y refers to a fatty acid having x carbon atoms and y double bonds; levels determined by GC-FAME (ISO 12966-2 and ISO 12966-4)
IVFAME refers to calculated iodine value;
SAFA refers to saturated fatty acids;
Trans refers to trans fatty acids;
US-Nx refers to solid fat content determined by NMR on unstabilised fat at x°C (ISO 8292-1).

Comparative Example 1

Two comparative fat blends were prepared.

Comparative Fat C is a blend of 78.4% by weight chemically interesterified fully hydrogenated palm kernel stearin, 19.6% by weight of interesterified palm stearin with palm kernel stearin and 2% sorbitan tristearate.

Comparative Fat D is a blend of 92% by weight fully hydrogenated palm kernel stearin including 2% by weight sorbitan tristearate and 8% fully hydrogenated palm oil (iodine value lower than 3).

The analytical results of Comparative Fat C and Comparative Fat D are shown in Table 2.

TABLE 2

Fat composition of Comparative Fat C and Comparative Fat D

| | Comparative Fat C | Comparative Fat D |
|---|---|---|
| US-N20 | 91.6 | 95.4 |
| US-N25 | 77.1 | 90.5 |
| US-N30 | 42.0 | 53.5 |
| US-N35 | 3.2 | 13.2 |
| US-N40 | 0.3 | 6.4 |
| C8:0 | 1.6 | 1.5 |
| C10:0 | 2.5 | 2.4 |
| C12:0 | 48.0 | 50.1 |

TABLE 2-continued

Fat composition of Comparative Fat C and Comparative Fat D

|  | Comparative Fat C | Comparative Fat D |
|---|---|---|
| C14:0 | 18.8 | 20.0 |
| C15:0 | 0.0 | 0.0 |
| C16:0 | 17.6 | 13.3 |
| C16:1T | 0.0 | 0.0 |
| C16:1C | 0.0 | 0.0 |
| C17:0 | 0.0 | 0.0 |
| C18:0 | 8.8 | 12.1 |
| C18:1 | 2.0 | 0.2 |
| C18:1T | 0.1 | 0.0 |
| C18:1C | 1.9 | 0.2 |
| C18:2 | 0.3 | 0.0 |
| C18:2T | 0.0 | 0.0 |
| C18:2C | 0.3 | 0.0 |
| C18:3 | 0.0 | 0.0 |
| C18:3T | 0.0 | 0.0 |
| C18:3C | 0.0 | 0.0 |
| C20:0 | 0.2 | 0.2 |
| C20:1C | 0.0 | 0.0 |
| C20:2C | 0.0 | 0.0 |
| C22:0 | 0.0 | 0.0 |
| C22:1 | 0.1 | 0.0 |
| C22:1T | 0.0 | 0.0 |
| C22:1C | 0.1 | 0.0 |
| C24:0 | 0.0 | 0.0 |
| C24:1C | 0.1 | 0.0 |
| SAFA | 97.5 | 99.7 |
| MUFA | 2.1 | 0.2 |
| PUFA | 0.3 | 0.0 |
| IVFAME | 2.3 | 0.2 |
| Total Trans | 0.1 | 0.0 |
| Others | 0.1 | 0.1 |
| C18:0/C16:0 | 0.50 | 0.91 |

In the above table:
Cx:y refers to a fatty acid having x carbon atoms and y double bonds; levels determined by GC-FAME (ISO 12966-2 and ISO 12966-4)
IVFAME refers to calculated iodine value;
SAFA refers to saturated fatty acids;
Trans refers to trans fatty acids;
US-Nx refers to solid fat content determined by NMR on unstabilised fat at x°C (ISO 8292-1).

Example 2

The above fat blends were evaluated in the following model application. A chocolate compound was prepared according to the following recipe (Table 3):

TABLE 3 chocolate compound recipe

| Ingredient | Percentage |
|---|---|
| Sugar | 48 |
| Fat blend | 32 |
| Skimmed Milk Powder | 11 |
| Cocoa powder 10/12 | 9 |
| Lecithin | 0.4 |
| Vanillin, Givaudan 10824-71 | 0.02 |

The chocolate compound samples were evaluated as follows:
Determination Thermo-Tolerance at 38° C.

For this test, a circular shaped tablet with a diameter of about 35 mm and a thickness of about 5 mm was prepared and put in a petri dish. In the petri dish an axis scale with 4 axes was made, divided in 5 mm squares.

Another way of evaluation was carried out by wrapping compound tablets in alumina foils and storing at the same conditions as for the petri dishes.

These petri dishes were stored at 38° C. for 2 hours and the shape was inspected on deformation after 1 and 2 hours. The product made with Comparative Fat C showed significant deformations, while the compounds containing Fat A and Fat B did not show any deformation after 2 hours storage at 38° C. and showed better tolerance when compared to the product made with Comparative Fat D.

The wrapped tablet showed comparable results as for circular shaped tablet. The results are summarized in below table (Table 4):

TABLE 4

Evaluation of thermo-tolerance

| Fat | Coins | Wrapped in Al foil |
|---|---|---|
| Fat A | − | − |
| Fat B | − | − |
| Comparative Fat C | ++ | + |
| Comparative Fat D | − | + |

In the above table:
++: clear deformation;
+: deformation;
−: no deformation

Sensory Evaluation

The tablets (Fat A and Fat B) were stored at 20° C. for 6 weeks and 12 weeks and evaluated on a number of sensory characteristics against the comparative sample (Comparative Fat D). Because the product made with Comparative Fat C did not pass the thermo-tolerance test, this sample was not tested in the sensory evaluation. The samples were evaluated for relative Hardness (first bite), Meltdown, Spreadability, Coolness, Waxiness, Flavour release time, Flavour impact and Flavour after effect. The results are shown in the FIGS. 1 and 2.

Hardness

Figure 1:
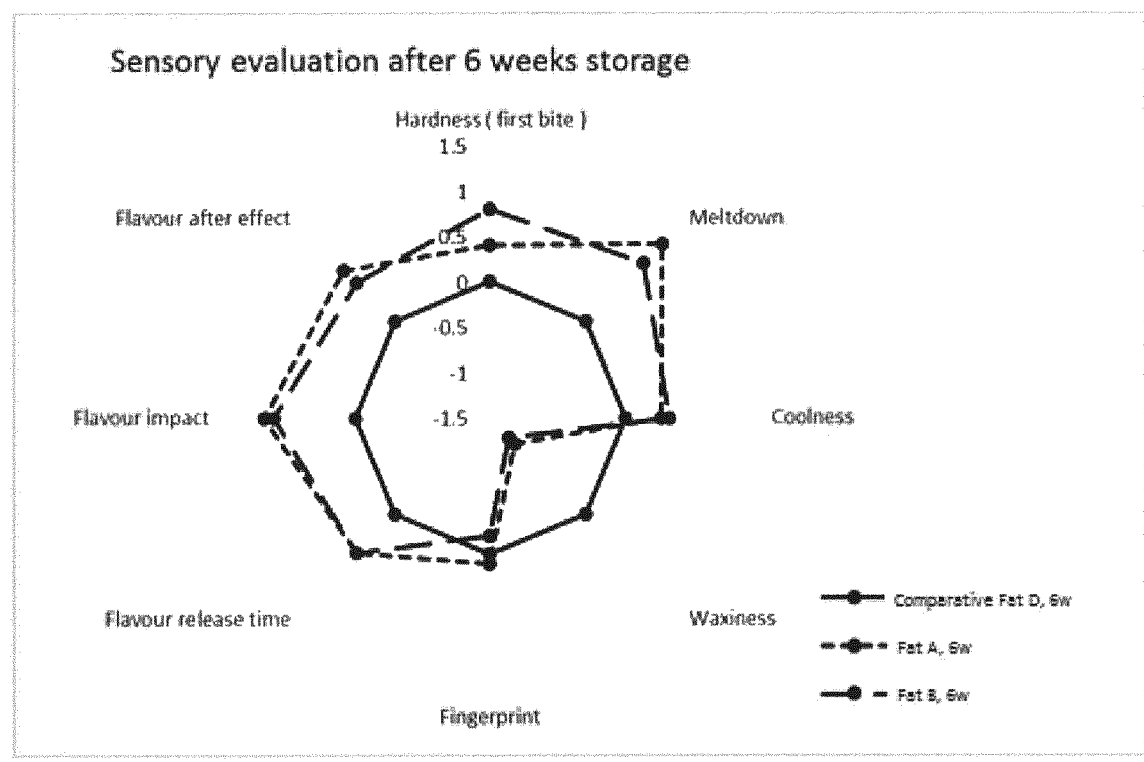
FIG. 1 shows the sensory evaluation after 6 weeks storage.
Figure 2:
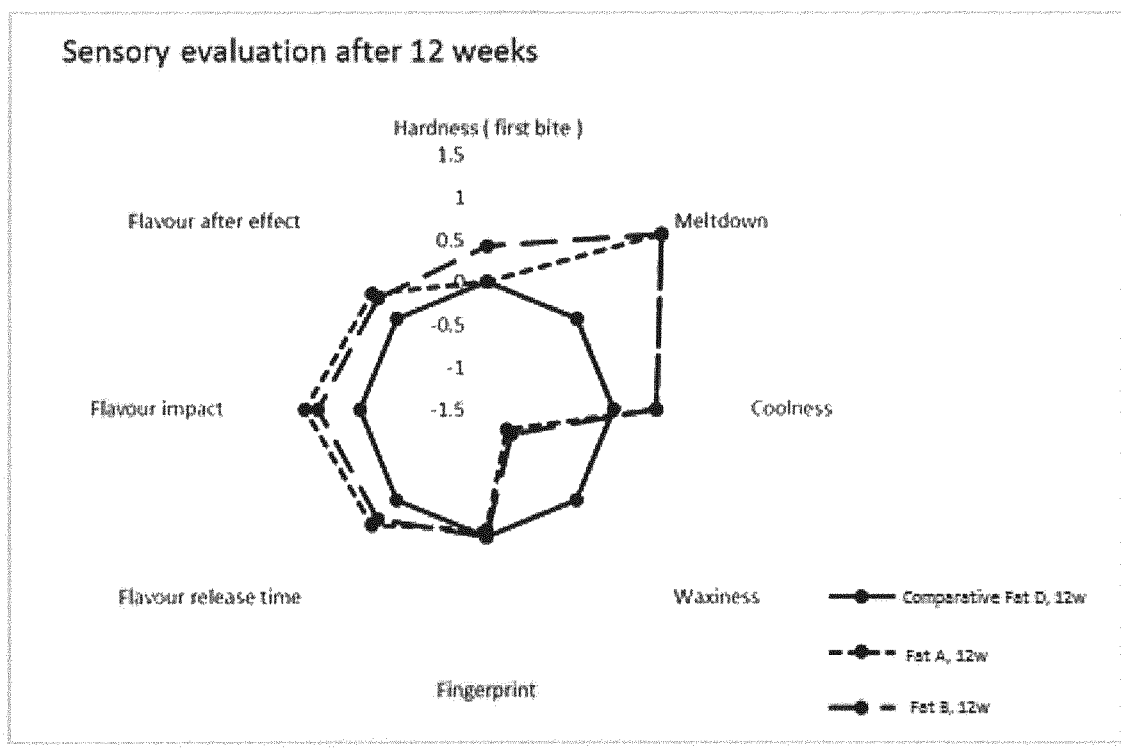
FIG. 2 shows the sensory evaluation after 12 weeks storage.

Hardness of the compound bars was measured using the Brookfield texture analyzer (needle TA9 and penetration depth of 2 mm at 0.5 mm/sec) after storing the samples at 20° C. for 2 weeks, 1 month and 2 months. Each sample was measured 5 times and the average results are shown in the following table.

TABLE 5

Hardness of the compound bars after storing at 20° C.

| Fat type in compound chocolate | 2 weeks | 1 month | 2 months |
|---|---|---|---|
| Fat A | 456 | 464 | 460 |
| Fat B | 490 | 500 | 536 |
| Comparative Fat D | 440 | 464 | 498 |

The invention claimed is:
1. A fat composition comprising
from 70% to 95% by weight hydrogenated palm kernel oil stearin;
from 5% to 25% by weight interesterified hydrogenated palm kernel oil stearin; and
from 1% to 4% by weight hydrogenated palm oil;
wherein the fat composition comprises:
from 48% to 58% by weight of lauric acid (C12:0);
from 5% to 15% by weight palmitic acid (C16:0); and from 5% to 20% by weight stearic acid (C18:0); and
having a weight ratio of stearic acid (C18:0) to palmitic acid (C16:0) of from 0.6:1 to 2.5:1;
said percentages of acids referring to acids bound as acyl groups in glycerides in the fat composition and being based on the total weight of C8 to C24 fatty acids;
and
wherein the fat composition has:
at least 40 solid fat content at 30° C.; and
at most 5 solid fat content at 40° C.;
measured on unstabilized fat according to ISO 8292-1.

2. The composition according to claim 1, wherein the composition has a weight ratio of stearic acid (C18:0) to palmitic acid (C16:0) of from 0.7:1 to 2:1.

3. The composition according to claim 1, wherein the composition has from 50% to 56% by weight of lauric acid (C12:0);
said percentages of lauric acid referring to lauric acid bound as acyl groups in glycerides in the fat composition and being based on the total weight of C8 to C24 fatty acids.

4. The composition according to claim 1, wherein the composition has:
at least 90 solid fat content at 20° C.;
from 40 to 55 solid fat content at 30° C.;
from 5 to 12 solid fat content at 35° C.; and/or
at most 4 solid fat content at 40° C.;
measured on unstabilized fat according to ISO 8292-1.

5. The composition according to claim 1, wherein the composition further comprises:
one or more emulsifiers.

6. The composition according to claim 5, comprising
from 1% to 3% by weight sorbitan tristearate.

7. The composition according to claim 1, wherein the composition has from 8% to 13% by weight palmitic acid (C16:0);
said percentages of palmitic acid referring to palmitic acid bound as acyl groups in glycerides in the fat composition and being based on the total weight of C8 to C24 fatty acids.

8. The composition according to claim 1, wherein the composition has from 8% to 13% by weight stearic acid (C18:0);
said percentages of stearic acid referring to stearic acid bound as acyl groups in glycerides in the fat composition and being based on the total weight of C8 to C24 fatty acids.

9. A process for making the fat composition of claim 1, which comprises the blending of
at least one hydrogenated lauric oil selected from palm kernel oil, palm kernel oil fractions, coconut oil, coconut oil fractions and mixture thereof;
at least one interesterified hydrogenated lauric oil selected from palm kernel oil, palm kernel oil fractions, coconut oil, coconut oil fractions and mixture thereof;
at least one non-lauric oil with iodine value lower than 15; and
optionally one or more emulsifiers.

10. The process for making the fat composition according to claim 9, which comprises the blending of hydrogenated palm kernel oil stearin, interesterified hydrogenated palm kernel oil stearin, hydrogenated palm oil and optionally sorbitan tristearate.

11. The process for making the fat composition according to claim 10, which comprises blending:
from 70% to 95% hydrogenated palm kernel oil stearin;
from 5% to 25% interesterified hydrogenated palm kernel oil stearin;
from 1% to 4% hydrogenated palm oil; and
optionally from 1% to 3% sorbitan tristearate.

12. A confectionery product comprising:
at least 20% by weight fat composition of claim 1; and
at least 30% by weight sugar or other sweeteners.

13. The confectionery product according to claim 12, comprising at least 5% by weight of one or more of milk powder, vegetable milk powder, dairy powder or mixture thereof.

* * * * *